United States Patent
Carbonneau et al.

[11] Patent Number: 5,274,379
[45] Date of Patent: Dec. 28, 1993

[54] OPTICAL IDENTIFICATION FRIEND-OR-FOE

[75] Inventors: Raymond Carbonneau, Gloucester; Jacques Dubois, Neufchatel; Maurice Gravel, Ste-Foy, all of Canada

[73] Assignee: Her Majesty the Queen as represented by the Minister of National Defence of Her Majesty's Canadian Government, Canada

[21] Appl. No.: 915,302

[22] Filed: Jul. 20, 1992

[30] Foreign Application Priority Data

Nov. 8, 1991 [CA] Canada ............... 2055198

[51] Int. Cl.⁵ .............................. G01S 13/78
[52] U.S. Cl. ........................ 342/45; 342/54; 342/6; 342/20
[58] Field of Search ......... 342/45, 44, 42, 54, 342/6, 20; 356/18, 368

[56] References Cited

U.S. PATENT DOCUMENTS

| | | | |
|---|---|---|---|
| 3,721,950 | 3/1973 | Jorgensen et al. | 342/51 X |
| 3,989,942 | 11/1976 | Waddoups | 342/6 X |
| 4,134,008 | 1/1979 | de Corlieu et al. | 342/6 X |
| 4,143,263 | 3/1979 | Eichweber | 342/6 X |
| 4,249,265 | 2/1981 | Coester | 342/45 X |
| 4,361,911 | 11/1982 | Buser et al. | 342/45 X |
| 4,694,297 | 9/1987 | Sewards | 342/45 |
| 4,731,879 | 3/1988 | Sepp et al. | 342/45 X |
| 4,763,361 | 8/1988 | Honeycutt et al. | 342/45 X |
| 4,814,769 | 3/1989 | Robin et al. | 342/45 |
| 4,851,849 | 7/1989 | Albersdoerfer | 342/43 |

FOREIGN PATENT DOCUMENTS

| | | |
|---|---|---|
| 2142944 | 3/1973 | Fed. Rep. of Germany . |
| 2215463 | 10/1973 | Fed. Rep. of Germany . |
| 3113154 | 12/1982 | Fed. Rep. of Germany . |
| 3323698 | 1/1985 | Fed. Rep. of Germany . |
| 2605416 | 10/1986 | France . |
| 2186457 | 8/1987 | United Kingdom . |

*Primary Examiner*—John B. Sotomayor
*Attorney, Agent, or Firm*—Larson and Taylor

[57] ABSTRACT

An identification friend-or-foe system for vehicles wherein each vehicle is provided with a radiation transmitter and a receiver with a detector for detecting radiation transmitted by other vehicles. Each transmitter can transmit a first coded signal which can be detected by the receivers in other vehicles, the receivers providing an unblocking signal after the first coded signal is correctly identified. The unblocking signal clears a radiation transmission path in the vehicle, the path containing a reflector which reflects the received signal back to the source of the transmission. The reflector adds a further predetermined code to the signal reflected from the reflector with each vehicle having another detector for detecting a reflected signal and a device to identify the further predetermined code.

19 Claims, 2 Drawing Sheets

OPTICAL IDENTIFICATION FRIEND-OR-FOE

FIELD OF THE INVENTION

The invention relates to interrogation-answering systems, in particular to battlefield identification friend-or-foe (IFF) systems, in which a transmitter in one vehicle transmits a coded signal to a target which responds with a signal after the target has analyzed the coded signal and verified, from the codes, that the transmitter is friendly.

BACKGROUND OF THE INVENTION

One of the problems that face platform commanders on a modern land battlefield is to positively identify targets which are detected within range of their weapon systems. Detection is not only based on visual means, such as panoramic or telescopic sights, but is also considerably enhanced by using thermal imaging equipment. However, even with the most sophisticated thermal viewers, identification of land vehicles is not straightforward. The signatures of land vehicles detected by those types of thermal viewers are dependent, to a very large degree, on uncontrollable factors such as the time a vehicle's engine has been running, the time a vehicle has been exposed to direct sunlight, etc. Identification of friend-or-foe (IFF) presents a very difficult decision for a tank commander who must often decide in a split-second whether or not to engage a detected target while, at the same time, trying to minimize any possibility of fratricide killing.

No current systems exists which provide reliable, rapid and positive identification of friend-or-foe (IFF) vehicles on modern land battlefields. Commanders still rely on low-resolution visual and infrared images to determine if detected targets, be they tanks or other support vehicles, are enemy ones or not. That information may be possibly supported by information derived from a radio network. However, it is not always possible to obtain information from a radio since tank commanders often have to operate under radio silence in order to avoid being detected by the enemy.

A few techniques of IFF are known with one way to achieve an IFF function being for a vehicle, such as a tank, to carry a transponder that emits a coded return when a radar pulse is received by its receiver. This type of system is described in U.S. Pat. No. 4,851,849 by Otto Albersdoerfer. A similar type of system is described in U.S. Pat. No. 4,694,297 by Alan Sewards. However, the system in the U.S. Pat. No. 4,694,297 does not require an active transponder but only an antenna on a target vehicle which can re-radiate or reflect a radar beam and modulate that re-radiated beam in a distinctive manner. This system is based on the idea that an illuminating radar would detect only a small reflected signal from a good antenna which is terminated in a matched load. However, all of the energy intercepted by that antenna will be re-radiated when the antenna terminating impedance provides a short circuit. A substantial reflected signal is then created which may be detected by the source of the illuminating radar beam. Therefore, an antenna on a target vehicle with a variable terminating impedance can modulate a re-radiated radar beam to the source and provide an identification signal with the passively reflected beam.

A few other techniques (mainly Optical IFF) are known such as those described in German Patents 2,215,463 (Precitronic Feinmech); 2,142,944 (Precintronic Ges Feinmech); 3,323,698 (Ant. Machr Ichtentech) and 3,113,154 (Precitronic Ges FEI). IFF systems are also described in French Patent 2,605,416 by Joquiet J. C. and U.S. Pat. No. 4,814,769 by Leon Robin et al.

SUMMARY OF THE INVENTION

The present invention generally falls into the Optical IFF (OIFF) category but, although based on a similar principle of operation, differs markedly from the prior art in the means used. Many of the techniques in the prior art give rise to very complex systems and their coding techniques are much less secure than those according to the present invention.

An identification friend-or-foe (IFF) system for vehicles, according to one embodiment of the present invention, requires that a radiation transmitter and a receiver for detecting radiation transmitted by other vehicles be located on each vehicle with each receiver having a means to detect and identify a first coded signal transmitted by transmitters on other vehicles and a means to provide an unblocking signal to a means to clear a radiation transmission path in the vehicle, the path containing a reflector to reflect a received signal after a predetermined code is identified and the path unblocked by said unblocking signal, the reflector including means to add a further predetermined code to a signal reflected from the reflector with each vehicle having a further means to detect the reflected signal.

BRIEF DESCRIPTION OF THE DRAWINGS

The following detailed description of the invention will be more readily understood when considered in conjunction with the accompanying drawings, in which.

DESCRIPTION OF THE PREFERRED EMBODIMENTS

Figure 1:
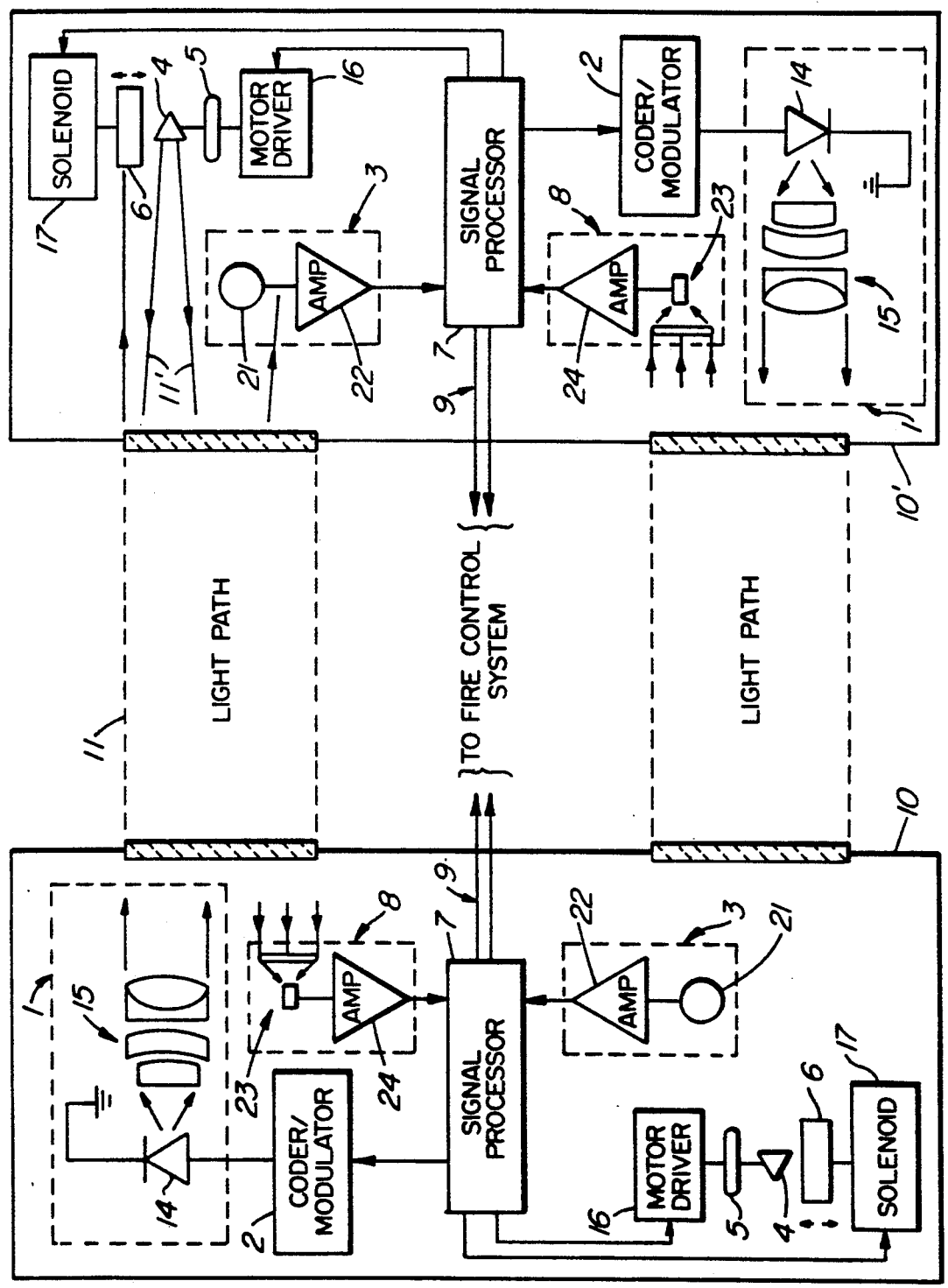
FIG. 1 is a block diagram of an identification friend-or-foe system according to one embodiment of the present invention.
Figure 2:
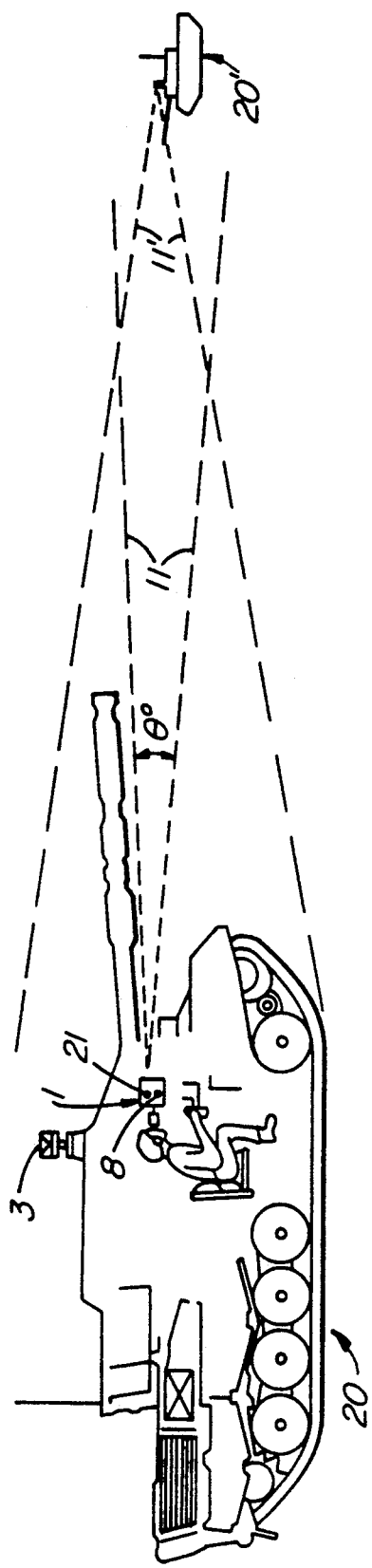
FIG. 2 is a prospective view illustrating the operation of the system shown in FIG. 1 with some components being shown in enlarged views in FIG. 2A and 2B.

An Optical Identification Friend-or-Foe (OIFF) system according to the present invention is illustrated in FIG. 1 and consists of a unit 10 that is located on one land vehicle, i.e. tank 20 and an identical unit 10 located on another tank 20' as shown in FIG. 2. Each unit 10, 10' includes an infrared laser transmitter 1 located in a gunner's sight with a coder/modulator 2 connected to a laser diode 14. Coder/modulator 2 is used to control and add predetermined codes to the emission from laser 14, which emission is transmitted through beam expanding optics 15 as a narrow beam along light path 11. A panoramic laser radiation detection unit 3, including a detector 21 and an amplifier 22, is located on each tank 20 and is connected to a signal processor 7 which can identify predetermined codes in laser transmissions detected by unit 3. Each unit 10, 10' also includes a rotating retroreflector corner cube 4 with a coding mask 12 (FIG. 2A and 2B) installed in an aperture of retroreflector 4. Retroreflector 4 is rotated by motor 5 under the control of a driver 16 which varies the rotational speed so that a predetermined code is added to any signal reflected by 4 back along light path 11'. Normally, the optical path to retroreflector 4 is blocked by an opaque cylinder 6 which surrounds retroreflector 4. However, a solenoid 17 can raise cylinder 6 so that the optical path to retroreflector 4 is cleared. These are the positions of cylinders 6 shown in FIG. 1. Solenoid 17 is activated when a predetermined code is identified by processor 7 as being in a transmission detected by unit 3.

The units 10 also include a narrow field of view detection system 8, including a detector 23 and an amplifier 24, for detection of any signal reflected by retroreflector 4 back along light path 11'. Detection system 8 is also connected to signal processor 7 where a predetermined code added by retroreflector 4 to a reflected signal can be identified. If that predetermined code is detected in a reflected signal by signal processor 7, the signal processor 7 sends a warning signal to the gunner and commander that a friendly tank is being engaged as well as a signal along cables 9 to a fire control system (not shown) which locks that fire control system to prevent that particular target from being engaged.

Operation of the OIFF system requires that each friendly tank be equipped with a unit 10 or 10' with the operation of the system being illustrated in FIG. 2. When the gunner in tank 20 wants to engage a target, in this case tank 20', he first triggers a laser rangefinder to acquire range data for the fire-control system in tank 20. Immediately after the rangefinder pulse has been emitted, or at the same time, the OIFF laser transmitter 1 is triggered to emit a series of coded laser pulses under the control of a coder or modulator 2 in order to transmit a pre-programmed code-of-the-day. The coded laser pulses are collimated by lenses 15 so that they are transmitted in a narrow angular cone with an angle of $\Theta°$ along light path 11. The emitted pulses will irradiate only one target 20' of interest and not other targets that may be in the immediate surrounding area as a result of the narrow beam. In the case when the target 20' is an unfriendly one, one not equipped with an OIFF system 10,, only a diffuse reflection of the transmitted pulses will be reflected back and picked up by the narrow field of view detection system 8, system 8 being also directed along the same light path 11. In the case of a friendly target, which is one provided with similar OIFF system 10', the transmitted coded pulses will be detected by the target's own panoramic laser radiation detection unit 3 and analyzed by its signal processor 7 where a decision is made as to the validity of the transmitted code. The target's OIFF system 10' send a warning to its commander that an unfriendly laser transmission has been detected if, after analysis, it is determined that the received code bears little resemblance to a predetermined code-of-the day. However, steps are taken to respond to a friendly interrogating laser source if the signal processor determines that the detected laser code is in agreement with the pre-programmed code-of-the day.

The steps taken to respond to a friendly interrogating laser transmitter is to first wait for a second transmission from the source 20 which will follow the first transmission after a preprogrammed known delay if the source is friendly. The signal processor 7, under control of the second transmission timing, will then clear the optical path to the rotating retroreflector corner cube 4 by activating the mechanical or electro-optical shutter 6. This will cause the second transmission to be strongly reflected back, in the form of a narrow beam, by reflector 4 along the light path 11' towards the source 20.

Figure 2B:
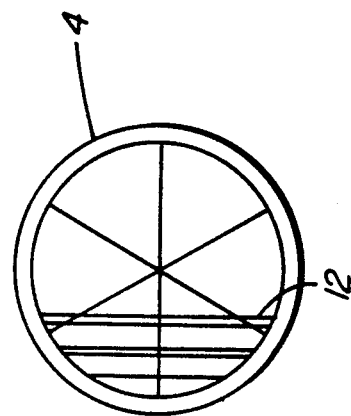
Figure 2A:
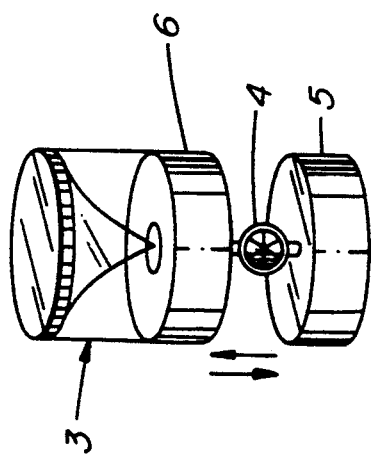

A double modulation is added to the signal reflected back along light path 11' by retroreflector 4 which modulation can be analyzed by the source 20 of the laser transmissions. The first modulation is provided by a computer controlled motor driver 16 which controls the speed of rotation of retroreflector 4 in a programmable manner. The rotation of retroreflector 4 acts as a light chopper on the laser beam being reflected such that the programmable speed of rotation will modulate the reflected beam with a predetermined code-of-the day. The second modulation of the reflected beam is produced by a mask 12 installed in the aperture of retroreflector 4. The mask 12, as shown in FIG. 2B, consists of a series of vertical bars of varied widths and/or spacing which act as small light chopper blades on the laser beam reflected by the rotating retroreflector 4. Each tank would have a different mask 12 installed in the aperture so that each mask 12 would provide a second modulation to the reflected beam which is specific to that tank and, as such, that modulation can be used to completely identify the particular tank which is being illuminated by the laser transmissions.

The double modulated reflected beam can then be picked-up by the narrow field of view detector 8 of the transmission source, i.e. tank 20 in FIG. 2, where the reflected beam is analyzed by a signal processor 7 and interpreted as the return of a beam reflected from a friendly tank 20'. The OIFF unit 10 then immediately sends a warning to the gunner and commander of tank 20 that a friendly tank 20' is being engaged and, at the same time, the processing electronics locks the fire-control systems of tank 20 so that the target 20' cannot be fired upon.

In a preferred embodiment, the laser transmitter 14 is a solid-state laser of conventional design which preferably operates at an eye-safe laser wavelength, i.e. over 1.5 microns, and whose transmission is coded either by generating a sequence of pulses representing a binary code or by modulating the transmissions amplitude or pulse width with a pre-programmed information code. The laser transmitter can share the same beam expanding optics with the gunner's sight rangefinder to maintain the divergence of the laser transmission to an acceptable level or may have its own separate beam expanding optics 15. The laser transmitter could be separate from the rangefinder laser or the same laser could be operated for both purposes.

The panoramic detection system 3 may be an off-axis paraboloid mirror, an off-axis spheroid mirror or simply a section of a reflecting cone which concentrates energy from all over the horizon onto a single detector. In an even simpler approach, the 360° field of view coverage may be provided by four detectors, each covering a 90° field of view, arranged at right angles to each other so that no mirror is required. This panoramic detector assembly is of a conventional design which is familiar to those skilled in the art.

The mechanical or electro-optical shutter 6 in one preferred embodiment is an opaque cylinder which can be moved up or down by a solenoid 17 in order to clear or block an optical path to the rotating corner reflector 4. In other embodiments, the optical transmission path to corner-reflector 4 can be controlled using well known electro-optical techniques such as by using PLZT crystals.

The rotating corner cube retroreflector needs to be located such that any interrogating beam is retroreflected to a transmitting source 20 for all azimuthal angles of arrival of transmissions from any transmitting sources. The rotating corner reflector cube is, as a result, able to answer multiple friendly interrogations simultaneously. Modulation of the radiation reflected by the corner cube retroreflector is obtained by varying its rate of rotation, the rotation being controlled by a computer controlled motor driver 16. The mask 12, which is installed in the aperture of the corner cube retroreflector to provide a second level of modulation to the reflected signal, can be simply a set of various width metal or plastic vertical bars directly glued onto the retroreflector. This second level of modulation provides a unique identification code for each target.

The narrow field of view detector 8 can share the same optics as the laser transmitter 1 by using a beam splitter or it can have its own optics of a conventional design. Alternatively, the narrow field of view detector 8 may be integrated in the gunner's sight where it would share the same optics as the rangefinder. In this last embodiment, the rangefinder detector can also be used as the narrow field of view detector.

A military platform equipped with this type of OIFF system would be able to interrogate another, similarly equipped, one with a narrow coded laser beam which only irradiates a small target area so that the code could only become known to the target tank. The response code of the interrogated tank is completely passive, only reflecting an interrogation beam, and can become known only if the appropriate identification code has been received to unblock the transmission path to the retroreflector cube. These features optimize security for the OIFF system.

Various modifications may be made to the preferred embodiments without departing from the spirit and scope of the invention as defined in the appended claims.

We claim:

1. An identification friend-or-foe system for vehicles comprising, in each vehicle, a narrow-beam radiation transmitter and a receiver with a panoramic detection means for detecting radiation transmitted by other vehicles from any direction around the horizon, the transmitter having a means for transmitting a first coded signal, and the receiver comprising a reflector, blocking means, having a blocking mode in which said blocking means completely encircles said reflector, for, in said blocking mode, blocking transmission to said reflector, and means for detecting and identifying the first coded signal transmitted by other vehicles and for, responsive thereto, providing an unblocking signal to the blocking means so as to clear a radiation transmission path completely around the reflector so that the reflector reflects a received signal received from any direction around the horizon after a predetermined code is identified and the transmission path is cleared responsive to said unblocking signal, the reflector comprising a continuously rotating retroreflector that reflects a signal received from any direction around the horizon back in that direction and said retroreflector including means for adding a further predetermined code to a signal reflected from said retroreflector, each vehicle including a further means directed in the same direction as the radiation transmitter for detecting a reflected signal.

2. A system as defined in claim 1, wherein the radiation transmitter is a laser that transmits a narrow beam.

3. A system as defined in claim 2, wherein the detection means is a panoramic laser radiation detection unit.

4. A system as defined in claim 3, wherein said further means is a narrow field of view detector for the reflected signal.

5. A system as defined in claim 4, wherein the detection means comprises a reflector having the shape of a section of a cone which reflects radiation from all over the horizon onto a single detector.

6. A system as defined in claim 4, wherein the detection means is a paraboloid mirror which reflects radiation onto a detector.

7. A system as defined in claim 4, wherein the detection means is a spheroid mirror reflecting light onto a detector.

8. A system as defined in claim 4, wherein the detection means comprises four 90° field of view detectors arranged to cover a 360° field of view.

9. A system as defined in claim 4, wherein the rotating retroreflector is a rotating corner cube retroreflector provided with a computer controlled motor drive which adds said further pre-determined code to the reflected signal by varying the speed of rotation.

10. A system as defined in claim 9, wherein a mask is installed in an aperture of the rotating corner cube retroreflector, the mask providing a second level of modulation to the reflected signal.

11. A system as defined in claim 10, wherein apertures in the mask are formed by spaced apart vertical bars which provide said second level of modulation.

12. A system as defined in claim 4, wherein the rotating retroreflector is a rotating corner cube retroreflector and the means to clear a radiation transmission path is a movable opaque cylinder surrounding the retroreflector and a solenoid to move the cylinder away from the retroreflector.

13. A system as defined in claim 4, wherein the rotating retroreflector is a rotating corner cube retroreflector and the means to clear a radiation transmission path is an electro-optical shutter.

14. A system as defined in claim 4, wherein the vehicles are provided with a fire-control system for a gunner including a laser rangefinder.

15. A system as defined in claim 14, wherein the narrow field of view detector is connected to a signal processor which identifies codes in a reflected signal and locks the fire-control system when the further predetermined code is detected.

16. A system as defined in claim 4, wherein the vehicles are provided with a fire-control system for a gunner including a laser rangefinder that shares beam expanding optics with the radiation transmitter.

17. A system as defined in claim 4, wherein the laser transmitter and the narrow field of view detector share the same optics through a beam splitter.

18. A system as defined in claim 16, wherein the narrow field of view detector is connected to a signal processor which identifies codes in a reflected signal and locks the fire-control system when the further predetermined code is detected.

19. A system as defined in claim 17 wherein the narrow field of view detector is connected to a signal processor which identifies codes in a reflected signal and locks a fire-control system when the further predetermined code is detected.

* * * * *